(12) United States Patent
Frantz

(10) Patent No.: US 9,352,625 B2
(45) Date of Patent: May 31, 2016

(54) OFF-VEHICLE TRAILER HITCH COUPLER LOCK AND ASSEMBLY

(71) Applicant: Donald R. Frantz, New Berlin, WI (US)

(72) Inventor: Donald R. Frantz, New Berlin, WI (US)

(*) Notice: Subject to any disclaimer, the term of this patent is extended or adjusted under 35 U.S.C. 154(b) by 0 days.

(21) Appl. No.: 14/645,553

(22) Filed: Mar. 12, 2015

(65) Prior Publication Data

US 2015/0258866 A1 Sep. 17, 2015

Related U.S. Application Data

(60) Provisional application No. 61/951,764, filed on Mar. 12, 2014.

(51) Int. Cl.
*B60D 1/06* (2006.01)
*B60D 1/60* (2006.01)

(52) U.S. Cl.
CPC ... *B60D 1/60* (2013.01); *B60D 1/06* (2013.01)

(58) Field of Classification Search
CPC .............. B60D 1/60; B60D 1/06; B60D 1/46
See application file for complete search history.

(56) References Cited

U.S. PATENT DOCUMENTS

| | | | | | |
|---|---|---|---|---|---|
| 3,233,913 | A * | 2/1966 | Brown | ...................... | B60D 1/28 280/480 |
| 4,232,877 | A * | 11/1980 | Milton | ..................... | B60D 1/07 280/416.1 |
| 4,697,818 | A * | 10/1987 | Moore | ..................... | B60D 1/07 280/416.1 |
| 4,807,899 | A * | 2/1989 | Belcher | .................... | B60D 1/38 280/477 |
| 5,222,755 | A * | 6/1993 | O'Neal | .................... | B60D 1/60 280/507 |
| 5,407,219 | A * | 4/1995 | Chiu | ......................... | B60D 1/60 280/422 |
| D488,110 | S * | 4/2004 | Borysenko | ................... | D12/162 |
| 6,980,096 | B1 * | 12/2005 | Washington, III | ....... | B60D 1/58 340/431 |
| 7,029,022 | B2 * | 4/2006 | Moss | ....................... | B60D 1/06 280/416.1 |
| 7,125,036 | B2 * | 10/2006 | Moss | ....................... | B60D 1/07 280/456.1 |
| D613,208 | S * | 4/2010 | McCoy | ......................... | D12/162 |
| D729,703 | S * | 5/2015 | Song | ............................ | D12/162 |
| D730,782 | S * | 6/2015 | Miller | .......................... | D12/162 |
| 2002/0113405 | A1 * | 8/2002 | Moss | ....................... | B60D 1/07 280/416.1 |
| 2003/0019258 | A1 * | 1/2003 | Irgens | ...................... | B60D 1/06 70/231 |
| 2003/0052472 | A1 * | 3/2003 | Moss | ....................... | B60D 1/06 280/415.1 |
| 2005/0173892 | A1 * | 8/2005 | Terminello | ............... | B60D 1/46 280/490.1 |
| 2009/0295123 | A1 * | 12/2009 | Good | ..................... | B60D 1/065 280/490.1 |
| 2012/0217724 | A1 * | 8/2012 | Works | ..................... | B60D 1/06 280/490.1 |

FOREIGN PATENT DOCUMENTS

GB 2394704 A * 5/2004 ............... B60D 1/60

* cited by examiner

*Primary Examiner* — Joseph Rocca
*Assistant Examiner* — Gabriela C Craciun
(74) *Attorney, Agent, or Firm* — Joseph S. Heino; Patrick M. Bergin

(57) ABSTRACT

The device and assembly provides a structure having two ball-shaped ends that are integrally formed as a single structure. With one of the balls inserted into a trailer coupler, the clamping device of the coupler can be locked as it would be when connected to a trailer hitch ball. The device and assembly of the present invention is intended to be a "filler" structure which prevents theft of a trailer using the coupler because the coupler cavity is filled and locked. Preferably, the ball ends are made of a single piece of hard plastic, nylon or metal material (although plastic is preferred for a light-weight structure) and connected to a cable that allows the device to be suspended from the coupler for use when necessary. Each ball is sized in accordance with at least two different sizes of hitch balls that are used in the coupler market.

4 Claims, 2 Drawing Sheets

OFF-VEHICLE TRAILER HITCH COUPLER LOCK AND ASSEMBLY

This application claims the benefit and priority of U.S. Provisional Patent Application No. 61/951,764 filed Mar. 12, 2014.

FIELD OF THE INVENTION

The present invention relates generally to locks and to hitch assemblies that are used for connecting and securing a towed vehicle, such as a trailer, to a towing vehicle. That is, the present invention relates generally to a trailer hitch coupler assembly that includes a socket adapted for receiving a trailer hitch ball and a clamp associated with the socket and operable for engaging a trailer hitch ball. More specifically, it relates to an off-vehicle coupler lock device and assembly that is configured to fill the hitch ball aperture of a coupler to prevent the coupler from being attached to a towing vehicle.

BACKGROUND OF THE INVENTION

Trailer hitch assemblies are well known in the art. Such assemblies are used with towing vehicles, such as cars and trucks, to allow them to pull towed vehicles, such as boat trailers, pop-up campers and the like, behind them. In one very common assembly, the towing vehicle is fitted with a hitch assembly having a tow hitch, which is a square-shaped hollow receiver tube mounted to the chassis of a towing vehicle at the rear of the vehicle. A portion of a ball mount is then inserted into the hollow of the receiver tube with the remaining portion of the ball mount extending rearwardly of the towing vehicle. The ball mount includes a bar that fits into the receiver that is attached to the vehicle and is secured to the receiver, typically by pinning it.

The ball mount includes a hitch ball that is attached to it and the bar of the ball mount may drop down to get the ball closer to the ground so that the towed vehicle, or trailer, will ride more or less level. The hitch ball is generally one having a certain diameter and also having a certain shank diameter to carry a desired load. Common hitch ball sizes include ball diameters of one and seven-eighths (1⅞) inches, two (2) inches and two and five-sixteenths (2 5/16) inches. The present invention is not limited to the precise size of hitch ball that the device can be used with. Hitch balls usually include a shank that distances the hitch ball above the hitch and provides a threaded connection to the vehicle, the threaded connection typically being completed by use of a nut. Common shanks have a round cross-section and, as alluded to, a user will select a hitch ball of a certain diameter and a shank of a certain diameter to achieve a certain towing load capacity. As a general rule, the larger the hitch ball and shank diameter, the greater the load that may be transferred through the trailer hitch assembly.

The towed vehicle, or trailer, is then fitted with a device that is used to secure the trailer to the towing vehicle. This is known as the trailer "tongue" or trailer "coupler." Trailer couplers come in several different configurations, but all work by clamping around the hitch ball. The means to do this varies somewhat. Some couplers employ a hand wheel to tighten the clamp to the hitch ball. More common, however, is an arrangement that uses a lever or toggle to lock the coupler. When the lever is flipped to the locked position, the clamp is pulled up against the underside of the hitch ball. The coupler also includes a mechanical device to bring a clamping member into contact with the bottom of the hitch ball. This arrangement essentially comprises a socket that captures the hitch ball and secures the towed vehicle to the towing vehicle. This forms a "ball and socket" connection to allow for relative movement between the towing vehicle and the towed vehicle, or trailer, while towing over a road surface, but is tight enough to prevent an accidental release of the clamp during use. When the mechanical device is disengaged, the clamping member is loose and the coupler can be lifted from the hitch ball. When the mechanical device is engaged, a clamping member is raised into contact or near contact to the bottom of the hitch ball, thereby "capturing" the hitch ball or otherwise securing the trailer to the hitch ball.

It is also known that the clamping device and the socket generally form an opening that is smaller than the hitch ball diameter so as to prevent the hitch ball from being disengaged from the coupler while towing. As an additional safety measure, the lever latch is secured with a pin or a padlock. The hitch ball and coupler assembly provides force transfer in both lateral and vertical directions and provides a pivot point allowing the vehicle to turn, bank and tilt slightly while towing the trailer and maintaining a secure attachment to the towing vehicle.

In the hitch assembly described above, it is also possible to completely remove the coupler from the hitch ball when the towed vehicle, or trailer, is not in use. This would be considered an "off-vehicle" situation relative to the coupler and the towed vehicle, or trailer. In the "off-vehicle" situation, however, it is also possible to attach and secure the coupler of that trailer to the hitch ball of any other towing vehicle because the opening formed by the clamping device and the socket is fully exposed from underneath.

SUMMARY OF THE INVENTION

In the view of these inventors, there is a need to prevent attachment of the coupler to the hitch ball when the coupler is "off-vehicle." The present invention provides such a lock device and assembly. The lock device and assembly of the present invention provides a structure having two ball-shaped ends that are integrally formed as a single structure. With one of the balls inserted into the coupler, the clamping device of the coupler can be locked as it would be such as when connected to a trailer hitch ball to prevent removal of the coupler from the hitch ball. Preferably, the ball ends are made of a single piece of hard plastic, nylon or metal material (although plastic is preferred for a light-weight structure) and connected to a cable that allows the device to be suspended from the coupler for use when necessary. Each ball is sized in accordance with at least two different sizes of hitch balls that are used in the coupler market. In short, the device and assembly of the present invention is intended to be a "filler" structure of sorts which prevents theft of a trailer via its coupler because the couple cavity is already filled.

The foregoing and other features of the device and assembly of the present invention will be apparent from the detailed description that follows.

DETAILED DESCRIPTION OF THE INVENTION

Figure 1:
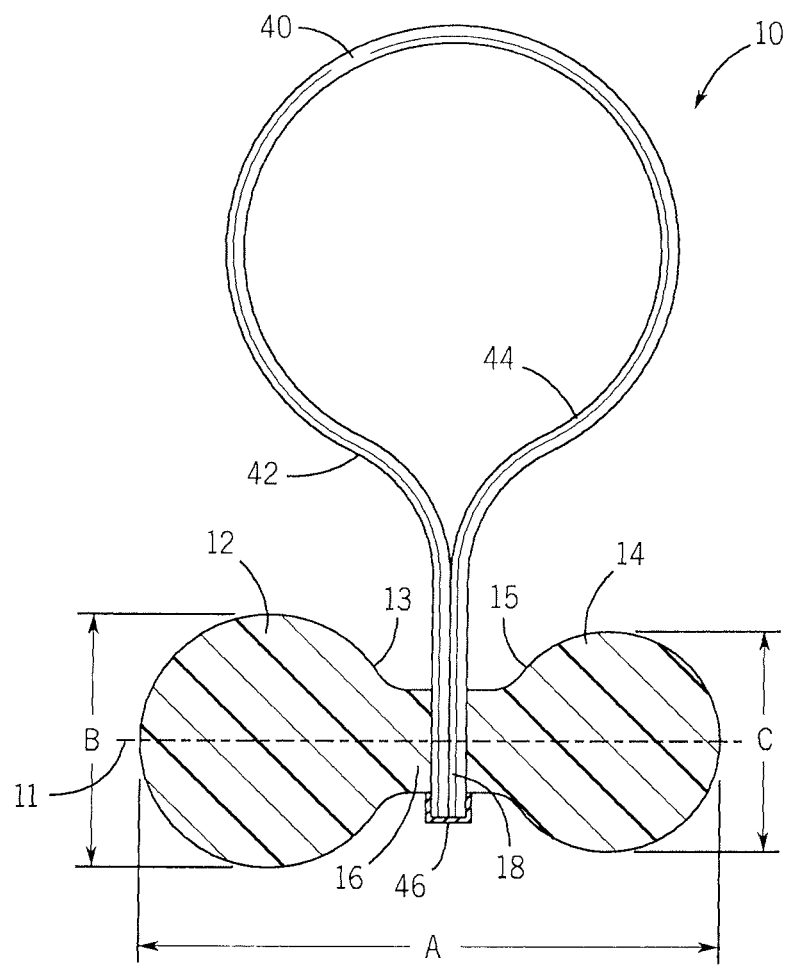
FIG. 1 is a front elevational view of an "off-vehicle" lock device constructed in accordance with the present invention.
Figure 2:
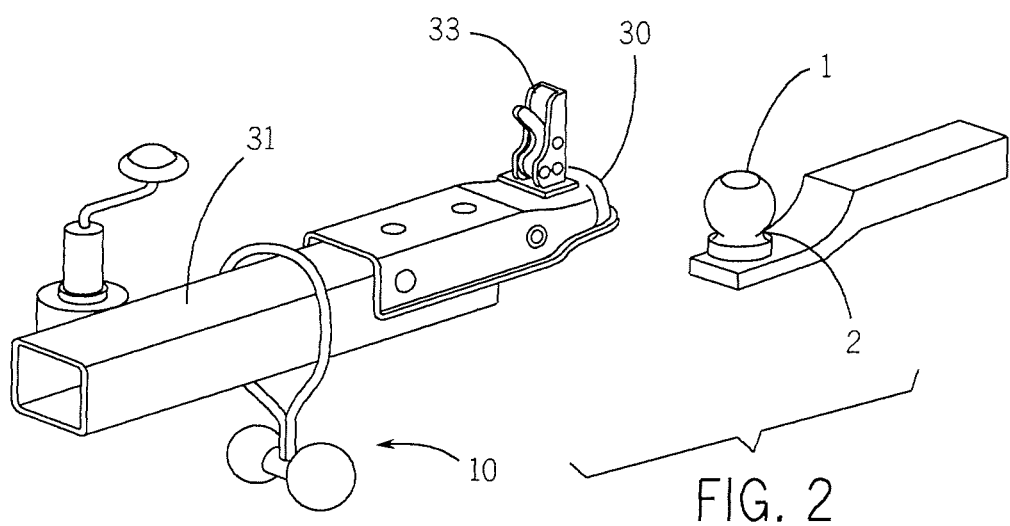
FIG. 2 is a perspective view of a coupler that the "off-vehicle" lock device is intended to be used with together with a perspective view of a hitch ball with which the device illustrated in FIG. 1 is intended to replace when the lock device is used with the coupler.
Figure 3:
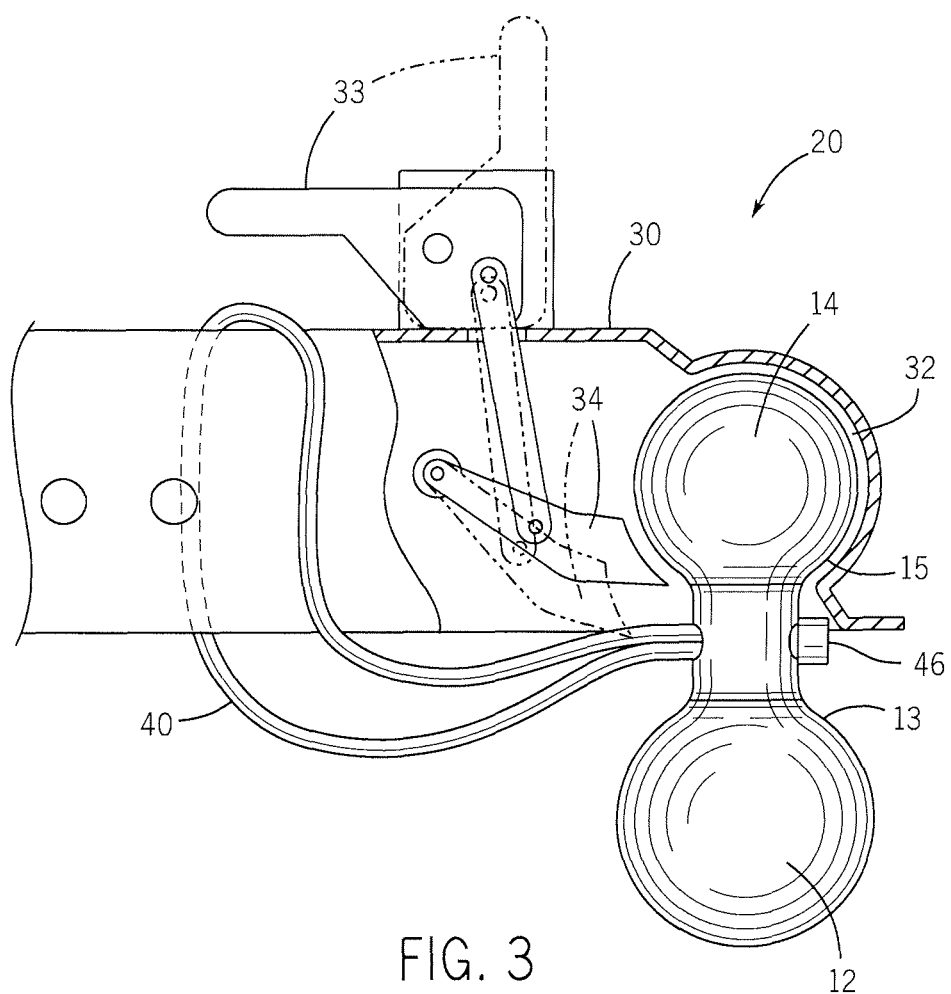
FIG. 3 is a cross-sectioned side elevational view of the assembly of the present invention, which includes the "off-vehicle" lock device as used with the coupler.

Referring now to the drawings in detail, wherein like numbered elements correspond to like elements throughout, FIG. 1 shows an "off-vehicle" lock device, generally identified 10, that is used in the assembly of the present invention, the assembly being generally identified 20 and shown in FIG. 3. The lock device 10 is a substantially integrally-formed and dumb-bell shaped structure comprised of a first ball end 12 and a second ball end 14. Each ball end 12, 14 is positioned in a way that it opposes the other generally along a longitudinal axis 11. In the preferred embodiment of the present invention, each ball end 12, 14 comprises an undercut portion 13, 15, respectively. This construction replicates that of a hitch ball 1 of current manufacture. See FIG. 2. Preferably, the ball ends are made of a single piece of hard plastic, nylon or metal material (although plastic is preferred for a light-weight structure).

Also in the preferred embodiment of the present invention, the first ball end 12 has a diameter of two and five-sixteenths (2 5/16) inches (reference dimension "B" in FIG. 1) and the second ball end 14 has a diameter of one and seven-eighths (1 7/8) inches (reference dimension "C" in FIG. 1). It is to be understood and appreciated, however, that the two diameters of the ball ends can be altered and adapted as needed to accommodate hitch balls of other sizes. Also in the preferred embodiment, the total length of the device 10 is about four and 3/8ths (4 3/8) inches (reference dimension "A" in FIG. 1). The present invention is not limited to the precise size of hitch ball that the device can be used with. That is, the diametrical dimension of each ball end 12, 14 is not a limitation of the present invention. Further, the length of the device 10 is not a limitation of the present invention either. That is, the length of the device 10 can be different that the dimension A referenced above, as long each end ball 12, 14 is functionally capable of being a substitute for a hitch ball 1 of current manufacture irrespective of the overall length of the device 10. Of course, economy of manufacture will dictate a shorter length, i.e. because less material is used, as will functionality, i.e. a device 10 that is too long could potentially interfere with the intended ability of the device 10 to be cabled to a trailer tongue 31 or a coupler 30, as shown in FIG. 2.

Extending between the ends 12, 14, and connecting them to one another at the undercut portion 13, 15 of each is a center portion 16. The center portion 16 is configured to be thick enough to prevent the ball ends 12, 14 from being separated or being forced out of axial alignment, but thin enough to allow the ball ends 12, 14, and the undercut portion 13, 15 of each, to be substantially captured within the socket 32 of a trailer coupler 30—in much the same way that a hitch ball 1 would be captured. See FIGS. 2 and 3.

The center portion 16 also comprises an aperture 18 that is aligned substantially transversely to the longitudinal axis 15 of the lock device 10. In the preferred embodiment, two ends 42, 44 of a length of cable 40 pass through the aperture 18. Again, see FIG. 1. The ends 42, 44 of the cable 40 are then secured together by means of a clamping member 46, the clamping member 46 being sized to prevent it and the cable ends 42, 44 from being pulled through the aperture 18 of the center portion 16 of the device 10. Using the cable 40, the device 10 can be looped around the trailer tongue 31 or the coupler 30 when not in use.

In application, the "off-vehicle" lock device 10 is intended to be used with a trailer coupler 30 of typical manufacture, the trailer coupler 30 being attached to a trailer tongue 31. Again, see FIG. 2. It is to be understood that the trailer coupler 30 is of the type that comprises a lever 33 or other mechanical device that brings a clamping member 34 into contact with the bottom, or undercut portion, 2 of the hitch ball 1 when the hitch ball 1 is positioned within the hitch ball socket 32 of the coupler 30. When the lever 33 is lifted, the clamping member 34 is disengaged from the hitch ball 1 and the undercut portion 2 of the hitch ball 1 such that the coupler 30 can be lifted from the hitch ball 1. When the lever 33 is engaged, or lowered in the illustrated embodiment, the clamping member 34 is moved into contact or near contact to the undercut portion 2 of the hitch ball 1 securing the trailer to the hitch ball 1. As alluded to previously, an additional locking mechanism (not shown) must be used to secure the coupler 30 in its closed position and with the hitch ball 1 in place. In this way, the coupler 30 is locked to the hitch ball 1 and cannot be removed without removal of the locking mechanism.

In accordance with the present invention, the same action occurs with respect to the "off-vehicle" lock device 10. That is, the ball end 12, 14 of the "off-vehicle" device 10 that substantially matches the physical dimensions of the hitch ball 1 can be inserted into the hitch ball socket 32 of the coupler 30. Again, see FIG. 3. The lever 33 can then be moved such that the clamping member 34 of the coupler 30 engages the undercut portion 13, 15 of that ball end 12, 14—thereby acting on that ball end 12, 14 much in the same way as the coupler 30 would engage the hitch ball 1. In this way, the clamping member 34 and hitch ball socket 32 form an opening that is smaller than the diameter of the inserted ball end 12, 14, which prevents the ball end 12, 14 from being withdrawn from the coupler 30 while in the "off-vehicle" position. In short, the inserted end 12, 14 serves the same function as a hitch ball 1 which, when locked, does not allow the coupler 30 to be placed on the hitch ball 1 of another towing vehicle. At this point, the coupler lever 33 and the clamping member 34 must be locked with a padlock or other type of locking mechanism (not shown) of the type known that is known in the industry.

The details of the invention having been disclosed in accordance with the foregoing, I claim:

1. An off-vehicle lock device comprising:
   a first ball end;
   an undercut portion to the first ball end;
   a second ball end;
   an undercut portion to the second ball end; and
   a center portion disposed between the first and second ball ends, the center portion comprising an aperture;
   wherein the first ball end, the second ball end and the center portion are positioned along a longitudinal axis;
   wherein the center portion aperture is disposed substantially transversely relative to the longitudinal axis;
   wherein the undercut portions are configured to replicate the shape of a hitch ball such that both the first ball end and the second ball end can be alternatively captured within a socket of a trailer coupler; and
   wherein the first ball end comprises a diameter and the second ball end comprises a diameter, the diameter of the first ball end differing from the diameter of the second ball end.

2. The off-vehicle lock device of claim 1 further comprising a cable, a portion of the cable being secured within the center portion aperture.

3. The off-vehicle lock device of claim 1 wherein the first ball end, the second ball end and the center portion are integrally formed as a single structure.

4. The off-vehicle lock device of claim 1 wherein the ball ends are made of a single piece of hard plastic, nylon or metal material.

\* \* \* \* \*